United States Patent
Ikeno

(10) Patent No.: US 8,326,111 B2
(45) Date of Patent: Dec. 4, 2012

(54) RECORDING APPARATUS, RECORDING METHOD AND PROGRAM

(75) Inventor: Wataru Ikeno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1099 days.

(21) Appl. No.: 12/243,060

(22) Filed: Oct. 1, 2008

(65) Prior Publication Data

US 2009/0097824 A1    Apr. 16, 2009

(30) Foreign Application Priority Data

Oct. 16, 2007  (JP) ................................ 2007-269237

(51) Int. Cl.
*H04N 5/76* (2006.01)

(52) U.S. Cl. ........ 386/124; 386/291; 386/292; 386/293; 386/294; 386/295

(58) Field of Classification Search .................. 386/124, 386/291–295
See application file for complete search history.

(56) References Cited

U.S. PATENT DOCUMENTS

| | | | |
|---|---|---|---|
| 6,347,185 B1 * | 2/2002 | Takahashi et al. ............ | 386/239 |
| 2002/0186961 A1 * | 12/2002 | Kikuchi et al. ................ | 386/98 |
| 2005/0226592 A1 | 10/2005 | Saitoh et al. | |
| 2006/0140088 A1 | 6/2006 | Yoshida | |
| 2007/0255727 A1 | 11/2007 | Hirose et al. | |

FOREIGN PATENT DOCUMENTS

| | | |
|---|---|---|
| EP | 0 920 020 A1 | 6/1999 |
| EP | 1 316 960 A1 | 6/2003 |
| EP | 1 679 714 A1 | 7/2006 |
| JP | 8-180652 | 7/1996 |
| JP | 2002-218384 | 8/2002 |
| JP | 2003-308675 | 10/2003 |
| JP | 2003-319320 | 11/2003 |
| JP | 2005-4850 | 1/2005 |
| JP | 2005-6059 | 1/2005 |
| JP | 2005-84459 | 3/2005 |
| JP | 2005-293749 | * 10/2005 |
| JP | 2006-190382 | 7/2006 |
| JP | 2007-200409 | 8/2007 |
| WO | WO 2006/067761 A1 | 6/2006 |

OTHER PUBLICATIONS

Office Action issued Jun. 14, 2011, in Japanese Patent Application No. 2007-269237.

* cited by examiner

*Primary Examiner* — Carl Colin
*Assistant Examiner* — John Elmore
(74) *Attorney, Agent, or Firm* — Oblon, Spivak, McClelland, Maier & Neustadt, L.L.P.

(57) ABSTRACT

In a recording apparatus, an instruction section instructing start of recording of input data containing video data and/or audio data, a recording section recording, in a first recording mode, the input data in a recording medium as a separate unit from the input data previously recorded and recording, in a second recording mode, the input data in the recording medium successively as one unit with the input data previously recorded when instructed by the instruction section to start recording of the input data, and a control section controlling the recording section so that the input data is recorded in any of recording modes including the first recording mode and the second recording mode are provided, in accordance with number of units the input data recorded in the recording medium.

7 Claims, 9 Drawing Sheets

RECORDING APPARATUS, RECORDING METHOD AND PROGRAM

CROSS REFERENCES TO RELATED APPLICATIONS

The present invention contains subject matter related to Japanese Patent Application JP 2007-269237 filed in the Japan Patent Office on Oct. 16, 2007, the entire contents of which being incorporated herein by reference.

BACKGROUND OF THE INVENTION

1. Field of the Invention

The present invention relates to a recording apparatus, a recording method and a program.

2. Description of the Related Art

In recent years, a portable image pickup apparatus as a recording apparatus capable of recording data such as ambient video pictures and sound has become widespread. By using such image pickup apparatus, a user can save as data various events such as a child's entrance ceremony, a child's sports day and sceneries taken during travel.

Such image pickup apparatus usually has a recording start button. And when the recording start button is pressed by the user, the image pickup apparatus starts the recording of data, and when the recording start button is pressed again, the image pickup apparatus stops the recording of data. Further, the image pickup apparatus manages the data recorded as one clip starting from the start of recording of data by the pressing of the button until the stop of recording of data by the next pressing of the button. That is, when the image pickup apparatus stops recording of data and then starts recording of new data, the new data is recorded as a separate clip from the data recorded before the stopping.

Further, as described in WO2004/112027, for example, an image pickup apparatus records index files, clip metadata and the like as information relating to each clip, and thus, when playing back data, the user can start the playback from a desired clip.

SUMMARY OF THE INVENTION

Here, amount of data of the index files and clip metadata increases as the number of clips increases. Accordingly, in the image pickup apparatus of related art, upper limit number is set for the number of clips that can be recorded. Thus, in the image pickup apparatus of related art, there is a problem that, even if amount of data per clip is small and capacity of a recording medium is not full, when the number of clips reaches the upper limit number, no new data can be recorded.

In view of the foregoing, it is desirable to provide a new and improved recording apparatus, a recording method and a program enabling effective use of memory capacity of a recording medium.

According to an embodiment of the present invention, there is provided a recording apparatus including an instruction section instructing start of recording of input data containing video data and/or audio data, a recording section recording, in a first recording mode, the input data in a recording medium as a separate unit from the input data previously recorded, and recording, in a second recording mode, the input data in the recording medium successively as one unit with the input data previously recorded when instructed by the instruction section to start recording of the input data, and a control section controlling the recording section so that the input data is recorded in any of recording modes including the first recording mode and the second recording mode in accordance with number of units of the input data recorded in the recording medium.

With such configuration, the recording section operates in the first recording mode, the second recording mode or some other recording mode. The first recording mode is a recording mode for recording new input data in the recording medium as a separate unit from the input data previously recorded, and the second recording mode is a recording mode for recording new input data in the recording medium successively as one unit with the input data previously recorded. The control section sets such recording mode of the recording section in accordance with the number of units of the input data recorded on the recording medium.

For example, when the number of units of the input data recorded in the recording medium exceeds a predetermined number, the control section may control the recording section to record the input data in the second recording mode. As such, when the recording section is made to record input data in the second mode, the number of units of the input data in the recording medium can be maintained. Accordingly, a case can be prevented in which no new input data can be recorded because the number of units of the input data has reached the upper limit number even though there is enough capacity of the recording medium. That is, the recording apparatus can effectively use memory capacity of the recording medium.

Further, the control section may increase the frequency of the recording section recording in the second recording mode as the number of units of the input data recorded in the recording medium increases. With such configuration, increase rate of the number of units of the input data on the recording medium 246 can be suppressed.

Further, the control section may calculate expected number of recording units by dividing remaining time input data can be recorded in the recording medium by average recording time of multiple units of the input data recorded in the recording medium, and may control the recording section to record the input data in the second recording mode when the expected number of recording units exceeds remaining number of units of the input data that can be recorded in the recording medium. With such configuration, the control section may control the recording section to record input data in the first recording mode even if the number of units of the input data increases as long as the number of units of the input data and the recording time of the input data are balanced. As a result, it is possible to maintain a suitable relationship between the number of units of the input data and the data amount of input data on the recording medium.

Further, the recording section operating in the second recording mode may record in the recording medium boundary information indicating boundary of the input data previously recorded when recording of the input data starts in response to a recording start instruction from the instruction section. With such configuration, for example, when playing back input data, the playback can be started from the boundary of the input data indicated by the boundary information.

The recording apparatus further includes a playback section playing back the input data recorded in the recording medium, and when playing back input data at the boundary indicated by the boundary information, the playback section may lower playback volume of audio data contained in the input data. With such configuration, when playing back input data, noise which may occur at the boundary of input data indicated by the boundary information can be reduced.

According to another embodiment of the present invention, there is provided a recording method including the steps of generating input data containing video data and/or audio data, instructing start of recording of the input data in a recording medium, setting recording mode to any of recording modes including a first recording mode and a second recording mode in accordance with number of units of the input data recorded in the recording medium, and recording, in a first recording mode, the input data in the recording medium as a separate unit from the input data previously recorded and recording, in a second recording mode, the input data in the recording medium as one unit with the input data previously recorded.

According to another embodiment of the present invention, there is provided a program causing a computer to function as an input section generating input data containing video data and/or audio data, an instruction section instructing start of recording of the input data, a recording section recording, in a first recording mode, the input data in a recording medium as a separate unit from the input data previously recorded, and recording, in a second recording mode, the input data in the recording medium successively as one unit with the input data previously recorded when instructed by the instruction section to start recording of the input data, and a control section controlling the recording section so that the input data is recorded in any of recording modes including the first recording mode and the second recording mode in accordance with number of units of the input data recorded in the recording medium.

Such program can make hardware resources of a computer containing a CPU, a ROM, a RAM, and the like, for example, to execute functions of the above-described instruction section and the control section. That is, it is possible to make a computer using the program function as the above-described recording apparatus.

According to the embodiments of the present invention described above, it is possible to effectively use memory capacity of a recording medium.

DETAILED DESCRIPTION OF THE PREFERRED EMBODIMENTS

Figure 1:
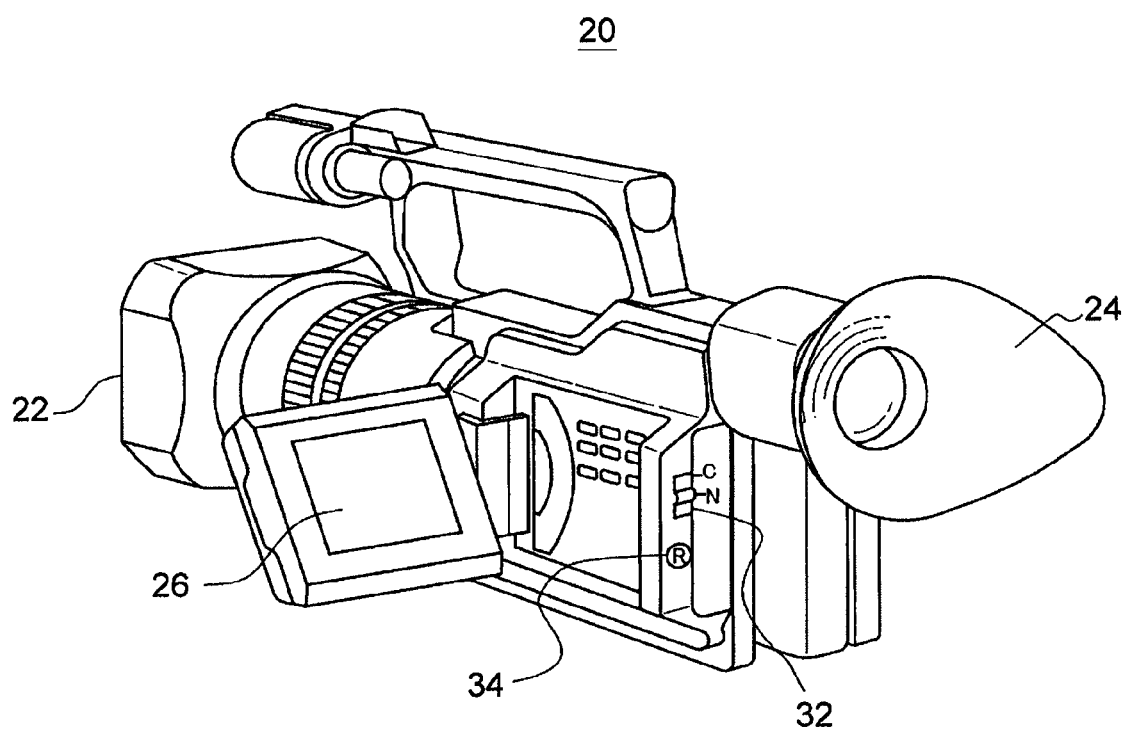
FIG. 1 is an external view of an image pickup apparatus according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment of the present invention will be described in the order shown below.

Figure 2:
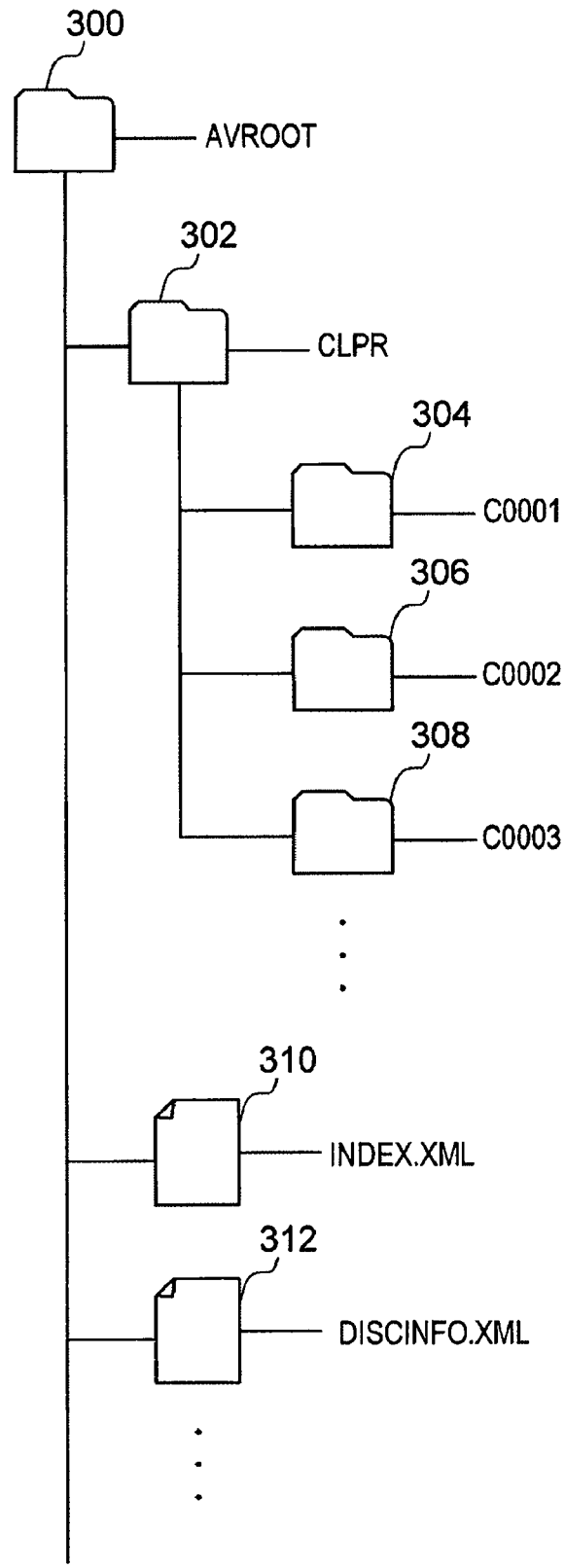
FIG. 2 is an explanatory diagram showing a configuration example of a file system according to the embodiment.
Figure 3:
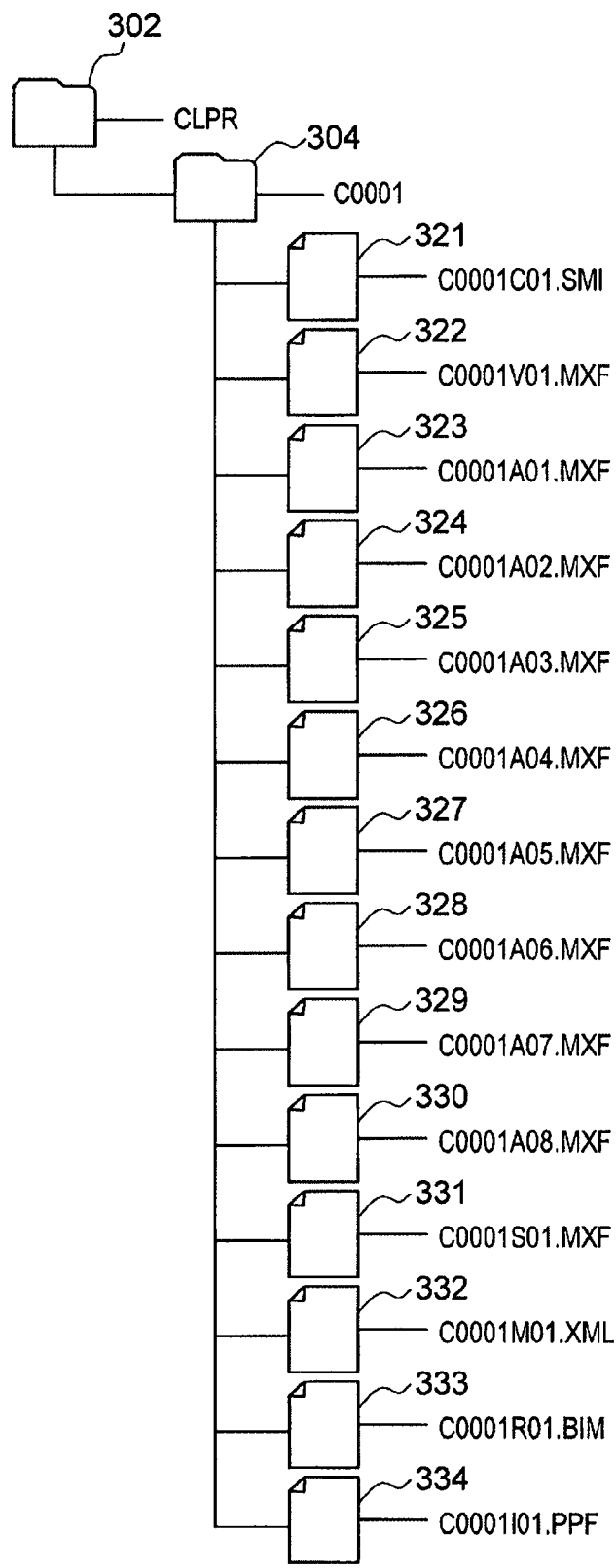
FIG. 3 is an explanatory diagram showing a detailed configuration of a first clip directory.

(1) Overview of an image pickup apparatus according to the embodiment
(2) Purpose of the embodiment
(3) Detailed description of the image pickup apparatus
(3-1) Hardware configuration of the image pickup apparatus
(3-2) Functions of the image pickup apparatus
(3-3) Operation of the image pickup apparatus
(4) Conclusion (1) Overview of an Image Pickup Apparatus According to the Embodiment First, with reference to FIGS. 1 to 3, an overview of an image pickup apparatus 20 according to the embodiment will be described.

FIG. 1 is an external view of the image pickup apparatus 20 according to the embodiment. As shown in FIG. 1, the image pickup apparatus 20 includes a lens section 22, a viewfinder 24, a monitor 26, a mode selection switch 32 and a record button 34.

The lens section 22 concentrates light emitted from a subject and forms an image of the subject at an appropriate position in the image pickup apparatus 20. The video image of the subject is formed on the viewfinder 24 and a user can adjust the direction the lens section 22 is to be directed at while checking the video image formed on the viewfinder 24.

The monitor 26 functions as a display section displaying a video image. For example, the monitor 26 can display a video image of a subject whose light is being concentrated by the lens section 22 at present or a video image which was recorded in the past.

The mode selection switch 32 is a switch for selecting manually a recording mode to be described in detail in "(3) Detailed description of the image pickup apparatus". In the example as shown in FIG. 1, the mode selection switch 32 is set to a normal mode "N". When the mode selection switch 32 is set to "C", the image pickup apparatus 20 operates in a continuous mode.

The record button 34 detects a user operation instructing starting of recording of data such as video and audio by the image pickup apparatus 20. Further, a user can instruct pausing of recording of data by pressing the record button 34 during recording of data.

Further, when processing other than instruction to start data recording is requested during the pause of recording of data, standby state for recording of next data is released, that is, pause state is released.

Incidentally, in FIG. 1, the image pickup apparatus 20 is shown only as an example of a recording apparatus, and the recording apparatus is not limited to the image pickup apparatus 20. For example, the recording apparatus may be an information processing apparatus such as a PC (Personal Computer), an image processing apparatus in homes (a DVD recorder, a video cassette recorder and the like), a mobile phone, a PHS (Personal Handyphone System), a portable music playback device, a portable image processing device, a PDA (Personal Digital Assistants), a home game machine, a portable game machine, home electronics and the like.

Subsequently, with reference to FIG. 2, a configuration of a file system of a built-in recording medium (recording medium 246 in FIG. 5) of the image pickup apparatus 20 according to the embodiment will be described.

FIG. 2 is an explanatory diagram showing the configuration example of the file system according to the embodiment. As shown in FIG. 2, multiple directories or files are located in the lower level of AVROOT 300. Specifically, a CLPR (hereinafter, "a clip root directory") 302, an INDEX.XML (hereinafter, "an index file") 310 and a DISCINFO.XML (hereinafter, "a disk information file") 312 are located in the lower level of the AVROOT 300.

Multiple directories different for each clip which is a unit of video/audio data recorded in the recording medium 246 are located in the lower level of the clip root directory 302. Specifically, a first clip directory (C0001) 304, a second clip directory (C0002) 306, a third clip directory (C0003) 308 and the like are located in the lower level of the clip root directory 302. A detailed configuration of each clip directory will be described with reference to FIG. 3.

The index file 310 contains management information for managing all the clips and edit lists recorded in the recording medium 246. Further, the disk information file 312 contains information such as attributes of the recording medium 246, a playback start position (previous playback stop position), or RecInhi (recording inhibiting information).

FIG. 3 is an explanatory diagram showing a detailed configuration of the first clip directory 304. As shown in FIG. 3, multiple files are located in the lower level of the first clip directory 304. Specifically, a clip information file (C0001C01.SMI) 321, a video data file (C0001V01.MXF) 322, audio data files (C0001A01.MXF) 323 to (C0001A08.MXF) 330, a low resolution data file (C0001S01.MXF) 331, a clip metadata file (C0001M01.XML) 332, a frame metadata file (C0001R01.BIM) 333 and a picture pointer file (C0001I01.PPF) 334 are located in the lower level of the first clip directory 304.

The video data file 322 contains video data of a first clip and the audio data files 323 to 330 contain audio data of the first clip. Further, the clip metadata file 332 contains a conversion table for relating, for example, a LTC (Linear Time Code) to a frame number.

Various files as shown in FIG. 3 are similarly located in the lower level of the other clip directories such as the second clip directory 306 and the third clip directory 308.

(2) Purpose of the Embodiment

Heretofore, the overview of the image pickup apparatus 20 according to the embodiment has been described with reference to FIG. 1 to 3. Subsequently, the purpose of the embodiment will be described.

Figure 4:
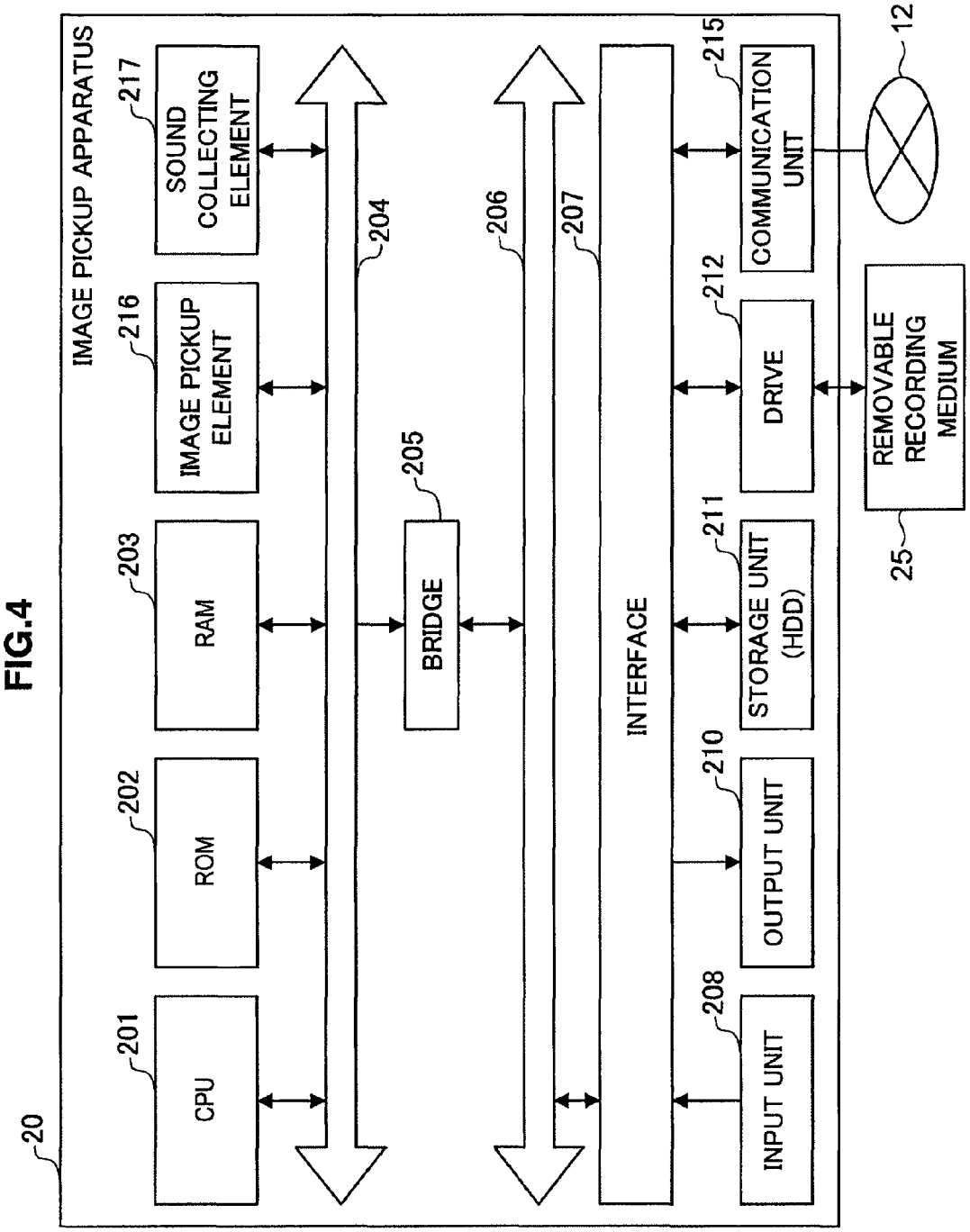
FIG. 4 is an explanatory diagram showing a hardware configuration of the image pickup apparatus according to the embodiment.

In order for the image pickup apparatus 20 to function as a practical recording/playback apparatus, when a recording medium is attached, the image pickup apparatus 20 reads out the following files and loads the files to a RAM (RAM 203 in FIG. 4).
  (1) Index file 310
  (2) Disk information file 312
  (3) Clip metadata file group (for example, clip metadata file 332)

Of the three types of files described above, it is known that amount of data of the disk information file 312 does not depend on the number of clips recorded in the recording medium. However, amount of data of the index file 310 and the clip metadata file group depends on the number of clips recorded in the recording medium.

The reason is that, with the index file 310, although normally only one file is contained in one recording medium, amount of data of a clip table contained in the index file 310 increases as the number of clips increases. Further, with the clip metadata file, since one file exists for each one clip, as the number of clips on the recording medium increases, the number of the clip data file itself increases.

When the number of clips on the recording medium is small (for example, about several tens), time taken for reading out the three types of files described above and loading the files to the RAM will cause no problem (for example, several seconds). However, when the number of clips on the recording medium is large (for example, about several hundreds to thousands), time taken for reading out the three types of files described above and loading the same to the RAM might become a level that may cause some problems to the practical use (for example, several tens of seconds).

That is, when a user attaches a recording medium to, for example, an image pickup apparatus relating to the embodiment to playback a clip recorded in the recording medium, the user might have to wait for the above-described length of time until the playback is actually started.

Further, when an apparatus is for business use, for example, it might be used for news gathering, and thus, shortening of waiting time for recording may become more critical. That is, to record swiftly a sudden event, the waiting time from the attaching of a recording medium to the start of recording is required to be as short as possible.

To cope with such a requirement, as described in WO2004/112027, for example, a method can be conceived which provides an image pickup apparatus with a buffer memory to accumulate image data signal and audio data signal input during the above-described waiting time. However, due to restrictions such as the cost, the size of an apparatus and power consumption, it is hard to provide a limitless capacity.

Because of such restrictions, upper limit number was set for the number of clips that can be recorded on the recording medium (for example, 300), and when that upper limit number was reached, no more clips were able to be recorded on the recording medium.

As a result, when an image pickup apparatus is used where extremely short recordings (for example, about 2 to 3 seconds) are repeated, a problem arises that, even though there is plenty of total recordable time in a disk (for example, 2 hours), no more clip-recording on the disk is made possible before even coming close to filling the disk (for example, at a point where recording of about 10 minutes (2 seconds×300 clips) is done).

Thus, in view of the foregoing, the image pickup apparatus 20 according to the embodiment has been achieved. According to the image pickup apparatus 20 according to the embodiment, effective use of memory capacity of a recording medium is enabled. Hereunder, the image pickup apparatus 20 will be described in detail.

(3) Detailed Description of the Image Pickup Apparatus (3-1) Hardware Configuration of the Image Pickup Apparatus FIG. 4 is an explanatory diagram showing a hardware configuration of the image pickup apparatus 20 according to the embodiment. The image pickup apparatus 20 includes a CPU (Central Processing Unit) 201, a ROM (Read Only Memory) 202, a RAM (Random Access Memory) 203, a host bus 204, a bridge 205, an external bus 206, an interface 207, an input unit 208, an output unit 210, a storage unit (HDD)

211, a drive 212, a communication unit 215, an image pickup element 216 and a sound collecting element 217.

The CPU 201, which functions as an arithmetic processing unit and a control unit, controls the overall operations executed in the image pickup apparatus 20 according to various programs. Further, the CPU 201 may be a microprocessor. The ROM 202 stores the programs, the arithmetic parameters and the like used by the CPU 201. The RAM 203 temporarily stores programs used by the CPU 201 during execution and parameters that change arbitrarily in the execution and the like. These are connected with each other via the host bus 204 constituted with a CPU bus and the like.

The host bus 204 is connected to the external bus 206 such as a PCI (Peripheral Component Interconnect/Interface) bus via the bridge 205. Incidentally, it is not necessary to constitute the host bus 204, the bridge 205 and the external bus 206 separately, and those functions may be implemented in a single bus.

The input unit 208 is constituted with an input means operated by a user to input information such as a mouse, a keyboard, a touch panel, buttons, a microphone, a switch and a lever, and an input control circuit that generates an input signal based on the input by the user and outputs the input signal thus generated to the CPU 201. The user of the image pickup apparatus 20 can input various data to the image pickup apparatus 20 and instructs the image pickup apparatus 20 of processing operation by operating on the input unit 208 (for example, the mode selection switch 32 and the record button 34 as shown in FIG. 1).

The output unit 210 is constituted with a display unit such as a CRT (Cathode Ray Tube) display unit, a LCD (liquid crystal display) unit, an OLED (Organic Light Emitting Display) unit or a lamp, and an audio output unit such as a speaker and a headphone. The output unit 210 outputs played back video data and audio data, for example. Specifically, the display unit displays various information such as the played back video data as text information or as an image. On the other hand, the audio output unit converts the played back audio data and the like to audio and outputs the conversion result as sound.

The storage unit 211 is a unit for storing data constituted as an example of the recording medium of the image pickup apparatus 20 according to the embodiment. The storage unit 211 may include a storage medium, a recording unit recording data into the storage medium, a read-out unit reading out data from the storage unit and a delete unit deleting data recorded in the storage unit. The storage unit 211 is constituted with a HDD (Hard Disk Drive), for example. The storage unit 211 drives a hard disk and stores programs executed by the CPU 201 and various data. Further, various files as described above are recorded in the storage unit 211.

The drive 212 is a reader/writer for a storage medium, and is provided to the image pickup apparatus 20 as an internal unit or as a peripheral unit. The drive 212 reads out the information recorded in a removable recording medium 25 attached such as a magnetic disk, an optical disk, a magneto-optical disk or a semiconductor memory, and outputs the information thus read out to the RAM 203.

The communication unit 215 is a communication interface constituted with, for example, a communication device and the like for connecting to a communication network 12. Further, the communication unit 215 may be a wireless LAN (Local Area Network)-compatible communication unit, a wireless USB-compatible communication unit or a wired communication unit that communicates by wire.

The image pickup element 216 converts the video image of a subject whose light is concentrated by the lens section 22 into video data which is an electrical signal. For example, the image pickup element 216 may be a CMOS image pickup element, a LBCAST image pickup element or a CCD (Charge Coupled Device).

The sound collecting element 217 converts sound emitted in the surrounding area into audio data which is an electrical signal. The sound collecting element 217 may be a microphone.

(3-2) Functions of the Image Pickup Apparatus

Heretofore, the hardware configuration of the image pickup apparatus 20 according to the embodiment has been described with reference to FIG. 4. Subsequently, the functions of the image pickup apparatus 20 will be described with reference to FIGS. 5 to 8.

Figure 5:
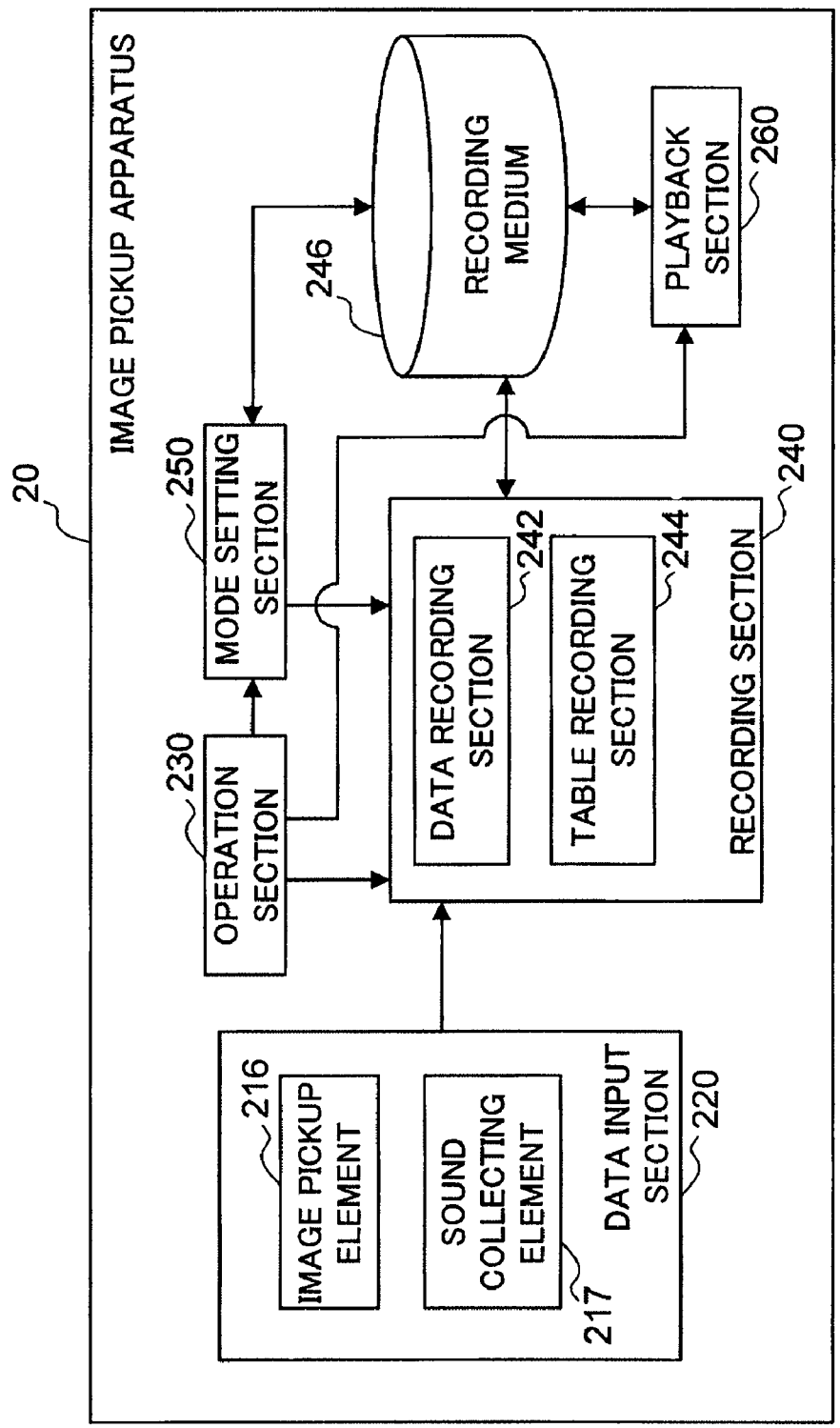
FIG. 5 is a function block diagram showing a configuration of the image pickup apparatus according to the embodiment.

FIG. 5 is a function block diagram showing a configuration of the image pickup apparatus 20 according to the embodiment. As shown in FIG. 5, the image pickup apparatus 20 includes a data input section 220, an operation section 230, a recording section 240, a recording medium 246, a mode setting section 250 and a playback section 260.

The data input section 220 includes the image pickup element 216 and the sound collecting element 217, and generates at least one of video data and audio data as input data. Incidentally, the image pickup apparatus 20 is shown only as an example of a recording apparatus, and the recording apparatus does not have to include the image pickup element 216 and the sound collecting element 217, but can merely have the video data or audio data input from the outside.

The operation section 230 corresponds to a user interface such as the mode selection switch 32 and a recording button 34 as shown in FIG. 1. For example, when the operation section 230 detects an operation for starting recording, the operation section 230 instructs the recording section 240 to record video data and audio data. Further, when the operation section 230 detects an operation for pausing recording, the operation section 230 instructs the recording section 240 to pause the recording of video data and audio data.

The recording section 240 includes a data recording section 242 and a table recording section 244.

The data recording section 242 records video data and audio data on the recording medium 246 in a recording mode set by the mode setting section 250. Specifically, the data recording section 242 records on the recording medium 246 the video data as the video data file 322 as shown in FIG. 3 and the audio data as audio data files 323 to 330.

As the recording mode, there is a normal mode which, when recording new video data and audio data, records on the recording medium 246 the new video data and audio data as separate clip from a previously recorded clip. For example, when six clips are recorded on the recording medium 246, the data recording section 242 operating in the normal mode records on the recording medium 246 the new video data and audio data as the seventh clip.

Further, as the recording mode, there is a continuous mode which records on the recording medium 246 new video data and audio data successively in a previously recorded clip. For example, when six clips are recorded on the recording medium 246, the data recording section 242 operating in the continuous mode records the new video data and audio data as the sixth clip. Hereunder, with reference to FIGS. 6 and 7, the normal mode and the continuous mode will be described more concretely.

Figure 6:
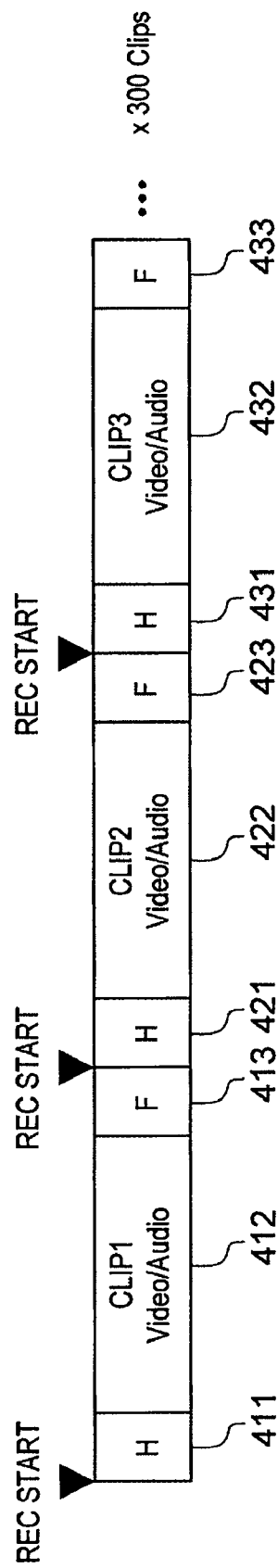
FIG. 6 is a view showing a frame format where clips are recorded in a normal mode.

FIG. 6 is a view showing a frame format where clips are recorded in the normal mode. In the normal mode, as shown in FIG. 6, when start of recording of a clip containing video data and audio data is instructed (REC START), a header (H) 411 of clip 1 is recorded on the recording medium 246, and the clip 1 (412) is recorded. Then, when pause of the recording is instructed, a footer (F) 413 of the clip 1 is recorded on the recording medium 246.

Thereafter, when start of recording of a clip is instructed, a header (H) 421 of clip 2 is recorded on the recording medium 246, and the clip 2 (422) is recorded. Then, when pause of the recording is instructed, a footer (F) 423 of the clip 2 is recorded on the recording medium 246.

As such, when the data recording section 242 operates in the normal mode, each time a recording is stopped or started, video data and audio data are recorded as a new clip. The same applies to clip 3 (a header 431, clip 3 (432), a footer 433).

Figure 7:
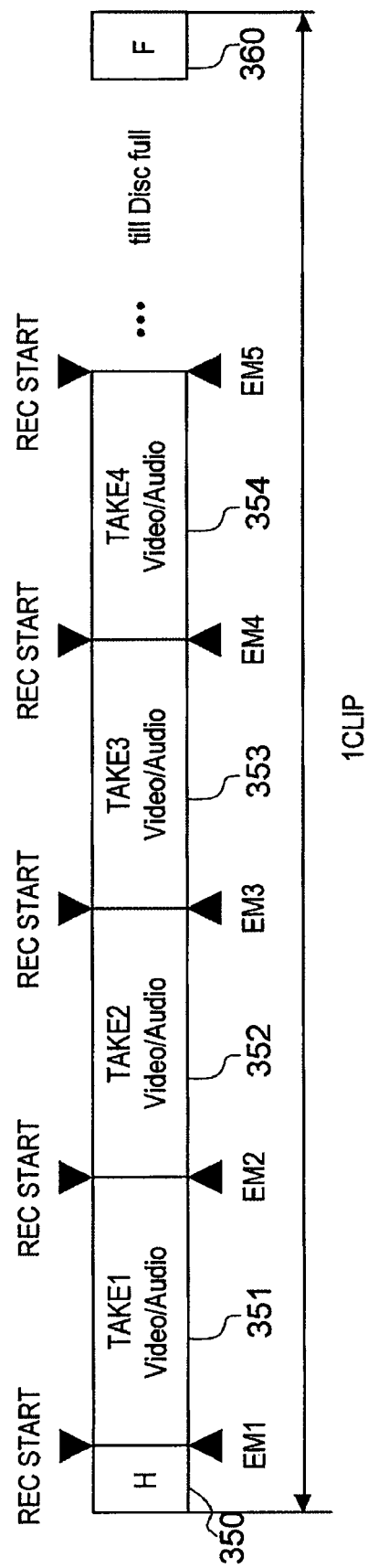
FIG. 7 is a view showing a frame format where clips are recorded in a continuous mode.

FIG. 7 is a view showing a frame format where clips are recorded in the continuous mode. In the continuous mode, as shown in FIG. 7, when start of recording of a clip containing video data and audio data is instructed, a header (H) 350 of clip 1 is recorded in the recording medium 246, and video data and audio data 351 is recorded until pause is instructed. Further, an EM1 (Essence Mark) indicating the recording start position of the video data and audio data 351 is recorded on the recording medium 246. Such EM1 may be used as a mark indicating the playback position when playing back the clip.

Thereafter, when start of recording of a clip is instructed, video data and audio data 352 is recorded on the recording medium 246 until pause is instructed. Further, an EM2 (Essence Mark) indicating the recording start position of the video data and audio data 352, that is, the boundary between the previously recorded data and the new data, is recorded on the recording medium 246.

When start of further recording of a clip is instructed, video data and audio data 353 is recorded on the recording medium 246 until pause is instructed. Further, an EM3 indicating the recording start position of the video data and audio data 353 is recorded on the recording medium 246. The same applies for video data and audio data 354, EM4 and EM5. Then, when stop of the recording is instructed, a footer 360 is recorded on the recording medium 246 and the header 350 to the footer 360 is made one clip unit.

Recording mode such as the normal mode and the continuous mode can be set by a user operation or, as described later, may be set automatically by the mode setting section 250.

The table recording section 244 records the index file 310 and the disk information 312 as shown in FIG. 2 on the recording medium 246, and also, updates the same. Further, the table recording section 244 may record the clip metadata file 332 containing the EM as shown in FIG. 7 on the recording medium 246.

Various files as shown in FIGS. 2 and 3 are recorded on the recording medium 246, and the recording medium 246 holds the various recorded files. The recording medium 246 may be a storage medium, for example, a non-volatile memory such as an EEPROM (Electrically Erasable Programmable Read-Only Memory) and an EPROM (Erasable Programmable Read Only Memory), a magnetic disk such as a hard disk and a circular magnetic disk, an optical disk such as a CD-R (Compact Disc Recordable) /RW (Rewritable), a DVD-R (Digital Versatile Disc Recordable) /RW/+R/+RW/RAM (Random Access Memory) and BD (Blu-ray Disc (registered trademark))-R/BD-RE or a MO (Magneto Optical) disk.

The mode setting section 250 functions as a control section switching the recording mode of the recording section 240 (data recording section 242) in accordance with the number of clips recorded on the recording medium 246.

For example, the mode setting section 250 may control the data recording section 242 so as to increase the frequency of recording in the continuous mode as the number of the clips recorded on the recording medium 246 increases. With such configuration, increase rate of the number of clips on the recording medium 246 can be suppressed.

Further, the mode setting section 250 may control the data recording section 242 to record clips in the continuous mode when the number of clips recorded in the recording medium 246 exceeds a predetermined number (for example, 200 clips, 250 clips). As such, when the data recording section 242 is made to record clips in the continuous mode, the number of clips in the recording medium can be maintained. Accordingly, a case can be prevented in which no new clip can be recorded because the number of clips has reached the upper limit number even though there is enough capacity of the recording medium 246. That is, it is possible to effectively use memory capacity of the recording medium 246.

Further, the mode setting section 250 may calculate expected number of recording units by dividing remaining time clips can be recorded in the recording medium 246 by average recording time of multiple clips recorded in the recording medium 246, and may control the data recording section 242 to record the clips in the continuous mode when the expected number of recording units exceeds remaining number of clips that can be recorded in the recording medium 246. With such configuration, the mode setting section 250 may control the data recording section 242 to record clips in the normal mode even if the number of clips increases as long as the number of clips and the recording time of the clips are balanced. As a result, it is possible to maintain a suitable relationship between the number of clips and the data amount of clips on the recording medium 246.

Further, the mode setting section 250 may control the data recording section 242 to record clips in the continuous mode when the average recording time of the multiple clips recorded on the recording medium 246 is shorter than the recording time obtained by dividing the total recording time clips can be recorded in the recording medium 246 by the upper limit of the number of clips that can be recorded in the recording medium 246.

The playback section 260 starts playback of clip recorded in the recording medium 246 when the operation section 230 detects a playback instruction. Here, when playing back audio data contained in the clip, the playback section 260 may lower the playback volume near the position indicated by an EM as shown in FIG. 8.

Figure 8:
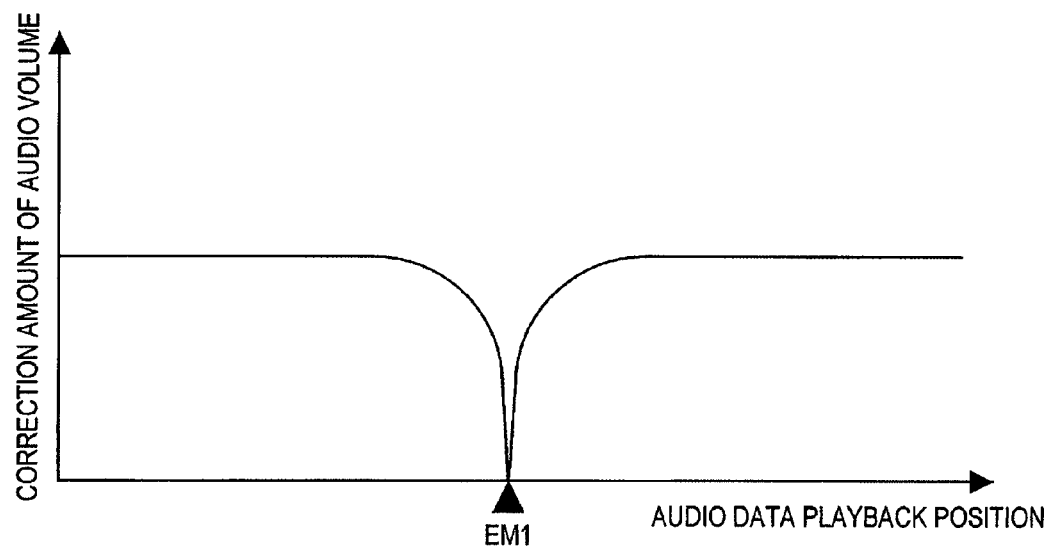
FIG. 8 is an explanatory diagram showing correction amount of playback volume of audio data by a playback section.

FIG. 8 is an explanatory diagram showing correction amount of playback volume of audio data by the playback section 260. As shown in FIG. 8, when playback position nears the position indicated by the EM1, the playback section 260 gradually lowers the correction amount of audio volume, and when playback position gets past the position indicated by the EM1, the playback section 260 gradually increases the correction amount of audio volume. With such configuration, when playing back a clip, noise which may occur at the position indicated by an EM can be reduced.

(3-3) Operation of the Image Pickup Apparatus

Heretofore, the configuration of the image pickup apparatus 20 according to the embodiment has been described. Subsequently, with reference to FIG. 9, the operation of the image pickup apparatus 20 will be described.

Figure 9:
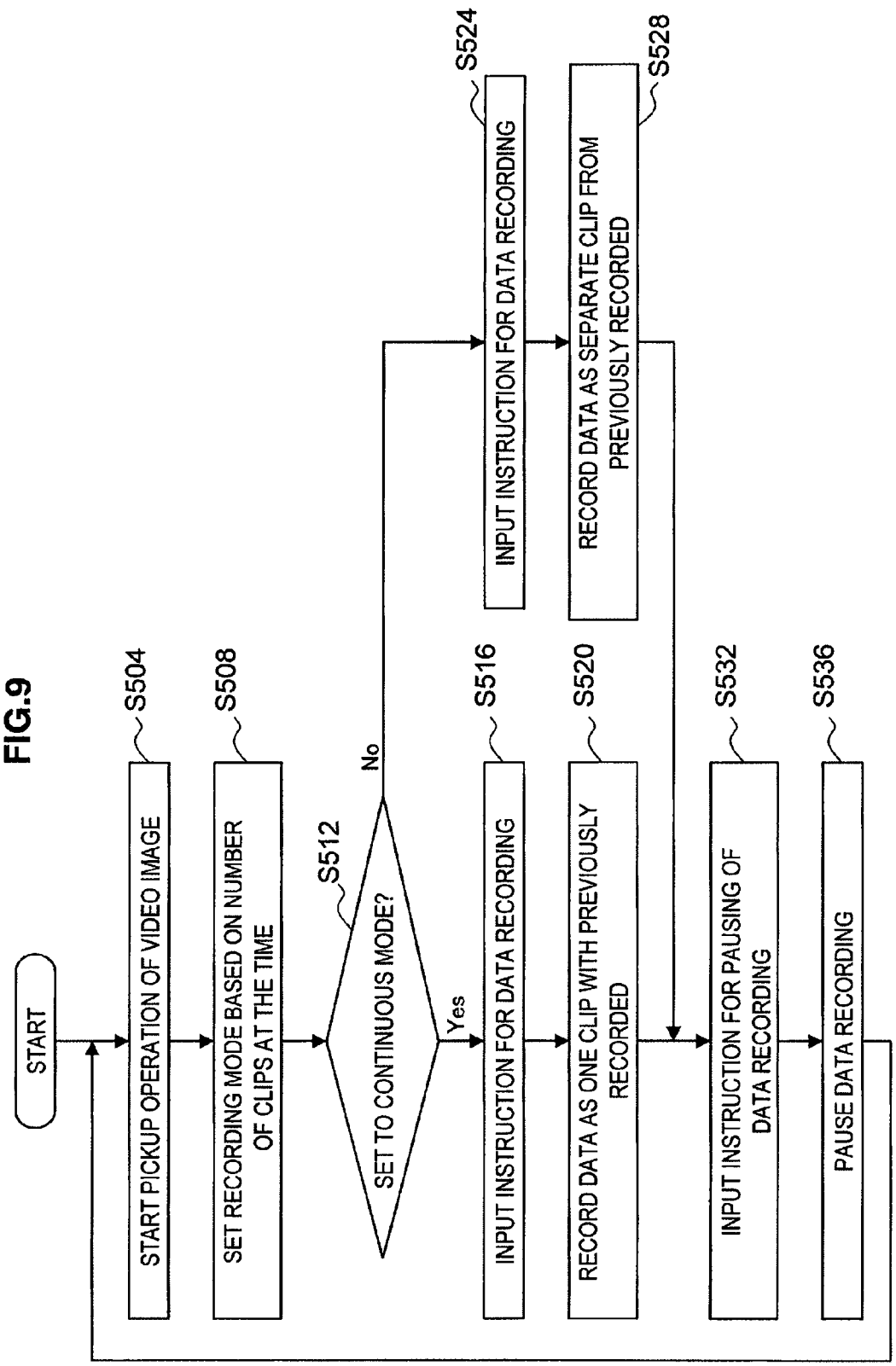
FIG. 9 is a flow chart showing a flow of a recording method performed by the image pickup apparatus according to the embodiment.

FIG. 9 is a flow chart showing a flow of a recording method performed by the image pickup apparatus 20 according to the embodiment. As shown in FIG. 9, when the image pickup element 216 of the image pickup apparatus 20 starts pickup operation of video (including audio, same in the following) (S504), the mode setting section 250 sets the recording mode based on the number of clips recorded on the recording medium at the time (S508).

When the recording mode is set to the continuous mode by the mode setting section 250 (S512), with an instruction for data recording input (S516), the data recording section 242 records new data as one clip with the previously recorded (S520).

On the other hand, when the recording mode is set to the normal mode by the mode setting section 250 (S512), with an instruction for data recording input (S524), the data recording section 242 records new data as separate clip from the previously recorded (S528).

After S520 or S528, when instruction for pause of data recording is input (S532), the data recording section 242 pauses the recording of data on the recording medium 246 (S536). Then, the processing is repeated from S504.

(4) Conclusion

As described above, the image pickup apparatus 20 according to the embodiment switches between the normal mode and the continuous mode based on the number of clips recorded on the recording medium 246. For example, when the number of clips recorded on the recording medium 246 increases, the image pickup apparatus 20 switches the recording mode to the continuous mode. Accordingly, in the image pickup apparatus 20, a case can be prevented in which no new clip can be recorded on the recording medium 246 even though there is enough capacity of the recording medium 246 because the number of clips has reached the upper limit number. That is, according to the embodiment, it is possible to effectively use memory capacity of the recording medium 246.

It should be understood by those skilled in the art that various modifications, combinations, sub-combinations and alterations may occur depending on design requirements and other factors insofar as they are within the scope of the appended claims or the equivalents thereof.

Each step in the processing of the image pickup apparatus 20 in the present specification does not necessarily have to be processed in time series according to the described order as a flow chart. For example, each step in the processing of the image pickup apparatus 20 may include processing executed in parallel or individually (for example, parallel processing or object-oriented processing).

Further, it is possible to create a computer program for making hardware such as the CPU 201, the ROM 202 and the RAM 203 embedded in the image pickup apparatus 20 fulfill the functions equivalent to each configuration described above of the image pickup apparatus 20. Further, a storage medium storing such computer program may also be provided. Further, by configuring each function block shown in the function block diagram of FIG. 5 by hardware, it is possible to realize the series of processings by hardware.

What is claimed is:

1. A recording apparatus comprising:
an instruction circuit configured to instruct a start of recording of input data containing video data and/or audio data;
a recording circuit configured to record, in a first recording mode, the input data in a recording medium as a separate unit from the input data previously recorded, and to record, in a second recording mode, the input data in the recording medium successively as one unit with the input data previously recorded when instructed by the instruction circuit to start recording of the input data; and
a control circuit configured to control the recording circuit so that the input data is recorded in a selected one of recording modes including the first recording mode and the second recording mode in accordance with a number of units of the input data previously recorded in the recording medium, wherein the control circuit:
calculates an expected number of recording units by dividing a remaining time of input data that can be recorded in the recording medium by an average recording time of multiple units of the input data recorded in the recording medium, and
controls the recording circuit so that the input data is recorded in the second recording mode when the expected number of recording units exceeds a remaining number of units of the input data that can be recorded in the recording medium.

2. The recording apparatus according to claim 1, wherein the control circuit controls the recording circuit so that the input data is recorded in the second recording mode when the number of units of the input data recorded in the recording medium exceeds a predetermined number.

3. The recording apparatus according to claim 1, wherein the control circuit increases a number of recording sections recorded in the second recording mode as the number of units of the input data recorded in the recording medium increases.

4. The recording apparatus according to claim 1, wherein the recording circuit operating in the second recording mode records, in the recording medium, boundary information indicating a boundary of the input data previously recorded when recording of the input data starts in response to a recording start instruction from the instruction circuit.

5. The recording apparatus according to claim 4, further comprising:
a playback circuit configured to play back the input data recorded in the recording medium, wherein
when playing back the input data at the boundary indicated by the boundary information, the playback circuit lowers a playback volume of audio data contained in the input data.

6. A recording method comprising:
generating input data containing video data and/or audio data;
instructing a start of recording of the input data in a recording medium;
setting a recording mode to a selected one of recording modes including a first recording mode and a second recording mode in accordance with a number of units of the input data previously recorded in the recording medium;
recording, in the first recording mode, the input data in the recording medium as a separate unit from the input data previously recorded;
recording, in the second recording mode, the input data in the recording medium as one unit with the input data previously recorded;
calculating an expected number of recording units by dividing a remaining time of input data that can be recorded in the recording medium by an average recording time of multiple units of the input data recorded in the recording medium; and
controlling recording so that the input data is recorded in the second recording mode when the expected number of recording units exceeds a remaining number of units of the input data that can be recorded in the recording medium.

7. A non-transitory computer readable recording medium on which is recorded a program for causing a computer to function as:

an input section generating input data containing video data and/or audio data;

an instruction section instructing start of recording of the input data;

a recording section recording, in a first recording mode, the input data in a recording medium as a separate unit from the input data previously recorded, and recording, in a second recording mode, the input data in the recording medium successively as one unit with the input data previously recorded when instructed by the instruction section to start recording of the input data; and a control section controlling the recording section so that the input data in a selected one of recording modes including the first recording mode and the second recording mode in accordance with a number of units of the input data recorded in the previously recording medium, wherein the control section:

calculates an expected number of recording units by dividing a remaining time of input data that can be recorded in the recording medium by an average recording time of multiple units of the input data recorded in the recording medium, and controls the recording section so that the input data is recorded in the second recording mode when the expected number of recording units exceeds a remaining number of units of the input data that can be recorded in the recording medium.

* * * * *